United States Patent [19]

Endo et al.

[11] Patent Number: 5,962,590

[45] Date of Patent: *Oct. 5, 1999

[54] GOLF BALL

[75] Inventors: Seiichiro Endo; Masatoshi Yokota, both of Shirakawa, Japan

[73] Assignee: Sumitomo Rubber Industries, Ltd., Hyogo-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/599,312

[22] Filed: Feb. 9, 1996

[30] Foreign Application Priority Data

Feb. 10, 1996 [JP] Japan ........................................ 7-46096

[51] Int. Cl.$^6$ ............................ A63B 37/12; C08L 33/02; C08L 23/08
[52] U.S. Cl. ........................ 525/221; 525/196; 525/201; 473/372; 473/385
[58] Field of Search ................................. 473/372, 385; 525/196, 201, 221

[56] References Cited

U.S. PATENT DOCUMENTS

| | | |
|---|---|---|
| 3,819,768 | 6/1974 | Molitor . |
| 5,298,571 | 3/1994 | Statz ........................................ 525/196 |
| 5,328,959 | 7/1994 | Sullivan .................................. 525/196 |
| 5,490,674 | 2/1996 | Hamada . |
| 5,586,950 | 12/1996 | Endo ........................................ 473/378 |

FOREIGN PATENT DOCUMENTS

| | | |
|---|---|---|
| 0661082 | 7/1995 | European Pat. Off. . |
| 2214515 | 9/1989 | United Kingdom . |
| 2247682 | 3/1992 | United Kingdom . |
| 2288604 | 10/1994 | United Kingdom . |

*Primary Examiner*—David Buttner
*Attorney, Agent, or Firm*—Birch, Stewart, Kolasch & Birch, LLP

[57] ABSTRACT

The present invention provides a golf ball having excellent controllability at the time of approach and excellent shot feel, wherein spin is easily put on. A cover of the golf ball is composed of a mixture of specific three ionomer resins (1), (2) and (3), wherein the total amount of the resin (1) and resin (2) is not less than 85% by weight and the amount of the resin (3) is not more than 15% by weight in the mixture as a main component, and wherein the amount of the resin (1) is 30 to 82% by weight and the amount of the resin (2) is 3 to 55% by weight in the total of the resin (1) and resin (2) and a stiffness of the cover composition is 1,000 to 2,000 kg/cm$^2$.

5 Claims, 1 Drawing Sheet

GOLF BALL

FIELD OF THE INVENTION

The present invention relates to a golf ball. More particularly, it relates to a golf ball having excellent controllability at the time of iron shot (particularly, at the time of approach) and excellent soft shot feel.

BACKGROUND OF THE INVENTION

Recently, an ionomer resin has widely been used as a base resin for the cover of the golf ball (e.g. Japanese Laid-Open Patent Publication No. 49-27093). Particularly, the ionomer resin is exclusively used in a two-piece golf ball using a solid core.

This is because the ionomer resin is superior in rebound performance, cut resistance, etc. and processability.

However, spin is not easily put on the golf ball using the ionomer resin as the base resin of the cover in comparison with a thread wound golf ball using balata (transpolyisoprene) as the base resin for the cover because the ionomer resin has high hardness and rigidity. Therefore, there is a drawback that controllability is inferior and shot feel (feeling at the time of hitting) is hard and inferior. Particularly, the inferior controllability at the time of approach is a significant drawback to the golf ball.

OBJECTS OF THE INVENTION

In order to solve the above problem, the present inventors have intensively studied about the base resin of the cover. As a result, it has been found that a golf ball having excellent controllability at the time of approach and excellent soft shot feel, wherein spin is sufficiently put on at the time of iron shot, can be obtained by using a cover composition comprising a mixture of the following resin (1), resin (2) and resin (3) as a main component, wherein the total amount of the resin (1) and resin (2) is not less than 85% by weight and the amount of the resin (3) is not more than 15% by weight in the mixture, and the amount of the resin (1) is 30 to 82% by weight and the amount of the resin (2) is 3 to 55% by weight in the total of the resin (1) and resin (2) and a stiffness of the cover composition is 1,000 to 2,000 kg/cm$^2$:

resin (1): an ionomer resin having a stiffness of 700 to 1,200 kg/cm$^2$, which is obtained by neutralizing a terpolymer of ethylene, methacrylic acid and acrylate with zinc ion;

resin (2): an ionomer resin having a stiffness of 2,500 to 5,000 kg/cm$^2$, which is obtained by neutralizing a copolymer of ethylene and methacrylic or acrylic acid with zinc ion; and resin (3): an ionomer resin having a stiffness of 2,300 to 5,000 kg/cm$^2$, which is obtained by neutralizing a copolymer of ethylene and methacrylic or acrylic acid with an alkaline metal ion.

An object of the present invention is to solve a problem of a conventional golf ball having an ionomer resin cover that controllability is inferior and shot feel is hard and inferior because spin is not easily put on the golf ball, thereby providing a golf ball having excellent controllability at the time of iron shot (particularly, at the time of approach) and excellent soft shot feel.

This object as well as other objects and advantages of the present invention will become apparent to those skilled in the art from the following description with reference to the accompanying drawings.

SUMMARY OF THE INVENTION

Figure 1:
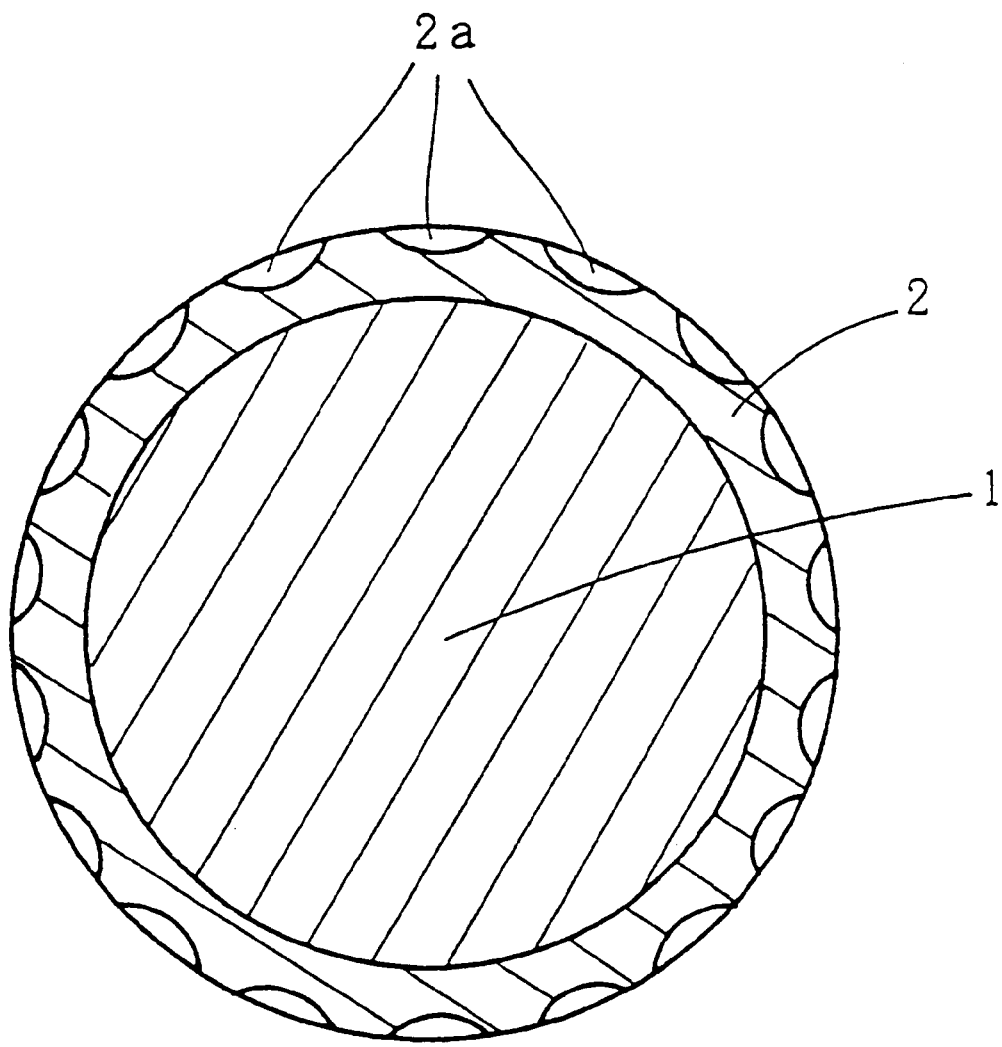
FIG. 1 is a schematic cross section illustrating one embodiment of the golf ball of the present invention.

The present invention provides a golf ball having a core and a cover for covering the core, wherein a base resin of said cover comprising a mixture of the following resin (1), resin (2) and resin (3) as a main component, the total amount of the resin (1) and resin (2) is not less than 85% by weight the amount of the resin (3) is not more than 15% by weight in the mixture, the amount of the resin (1) is 30 to 82% by weight the amount of the resin (2) is 3 to 55% by weight in the total of the resin (1) and resin (2) and a stiffness of the cover composition is 1,000 to 2,000 kg/cm$^2$:

resin (1): an ionomer resin having a stiffness of 700 to 1,200 kg/cm$^2$, which is obtained by neutralizing a terpolymer of ethylene, methacrylic acid and acrylate with zinc ion;

resin (2): an ionomer resin having a stiffness of 2,500 to 5,000 kg/cm$^2$, which is obtained by neutralizing a copolymer of ethylene and methacrylic or acrylic acid with zinc ion; and resin (3): an ionomer resin having a stiffness of 2,300 to 5,000 kg/cm$^2$, which is obtained by neutralizing a copolymer of ethylene and methacrylic or acrylic acid with an alkaline metal ion.

That is, in the present invention, spin could be sufficiently put on at the time of iron shot by using the resin (1) and resin (2), which are ionomer resins neutralized with zinc ion, in the total amount of not less than 85% by weight as the principal material, thereby improving controllability at the time of approach. In addition, the stiffness of the cover composition is adjusted to a low value such as 1,000 to 2,000 kg/cm$^2$ by increasing the proportion of the resin (1) having low stiffness among the ionomer resins neutralized with zinc ion, thereby obtaining good soft feeling at the time of hitting to improve shot feel.

DETAILED DESCRIPTION OF THE INVENTION

In the present invention, the reason why the total amount of the resin (1) and resin (2) is not less than 85% by weight and the amount of the resin (3) is not more than 15% by weight in the mixture of the resin (1), resin (2) and resin (3), which are used as the main component of the base resin of the cover, and the amount of the resin (1) is 30 to 82% by weight and the amount of the resin (2) is 3 to 55% by weight in the total of the resin (1) and resin (2) is as follows.

That is, when the total amount of the resin (1) and resin (2) is less than 85% by weight, it is impossible to put spin on the golf ball at the time of iron shot. In addition, run due to sand wedge is large and controllability at the time of approach is deteriorated and shot feel is also deteriorated. From the viewpoint of improving controllability at the time of approach, the larger the amount of the resin (1) and resin (2), which are ionomer resins neutralized with zinc ion, the better. However, these ionomer resins neutralized with zinc ion are inferior in molding properties and, therefore, the molding properties of those obtained by mixing the resin (3) as an ionomer resin having good molding properties neutralized with an alkaline metal is better than that and the workability at the time of covering the core with a cover is good. Accordingly, It is particularly preferred that the total amount of the resin (1) and resin (2) is 85 to 98% by weight and the amount of the resin (3) is 2 to 15% by weight.

In addition, when the amount of the resin (1) is less than 30% by weight (i.e. the amount of the resin (2) is more than 55% by weight) in the total of the resin (1) and resin (2), the stiffness is too high and the hardness also is high and, further, the spin amount is small, which results in deterioration of controllability and shot feel at the time of approach. On the other hand, when the amount of the resin (1) is more than 82% by weight (i.e. the amount of the resin (2) is less than 3% by weight), the stiffness is too small and the hardness is too low and, further, the golf ball is soft, which results in heavy shot feel. It is particularly preferred that the amount of the resin (1) is 35 to 80% by weight and that of the resin (2) is 10 to 55% by weight in the total of the resin (1) and resin (2).

In the present invention, the resin (1) which is a constituent component of the base resin of the cover is an ionomer resin having a stiffness of 700 to 1,200 kg/cm$^2$, which is obtained by neutralizing a terpolymer of ethylene, methacrylic acid and acrylate with zinc ion . The reason why this resin (1) requires the stiffness of 700 to 1,200 kg/cm$^2$ is as follows. That is, when the stiffness of the resin (1) is less than 700 kg/cm$^2$, the stiffness of the cover is too small and rebound performance is inferior. On the other hand, when the stiffness of the resin (1) exceeds 1200 kg/cm$^2$, spin performance is inferior.

In addition, examples of the resin (1) include Hi-milan 1855 (trade name) which is commercially available from Mitsui Du Pont Polychemical Co., Ltd.

In addition, the resin (2) is an ionomer resin having a stiffness of 2,500 to 5,000 kg/cm$^2$, which is obtained by neutralizing a copolymer of ethylene and methacrylic or acrylic acid with zinc ion, and it mainly compensate the stiffness when the stiffness of the resin (1) is small. The reason why this resin (2) requires the stiffness of 2,500 to 5,000 kg/cm$^2$ is as follows. That is, when the stiffness of the resin (2) is less than 2,500 kg/cm$^2$, rebound performance is inferior. On the other hand, when the stiffness of the resin (2) exceeds 5,000 kg/cm$^2$, spin performance is inferior.

Examples of the resin (2) include Hi-milan 1706, Hi-milan AM7315, Hi-milan AM7317 and Hi-milan 1557 (trade name), which are commercially available from Mitsui Du Pont Polychemical Co., Ltd.; Iotek 7010 (trade name) which is commercially available from Exxon Chemical Co.; etc.

The resin (3) is an ionomer resin having a stiffness of 2,300 to 5,000 kg/cm$^2$, which is obtained by neutralizing a copolymer of ethylene and methacrylic or acrylic acid with an alkaline metal ion (e.g. sodium ion, potassium ion, lithium ion, etc.), and it is formulated to improve rebound performance of the whole resin to some degree or maintain it. The reason why this resin (3) requires the stiffness of 2,300 to 5,000 kg/cm$^2$ is as follows. That is, when the stiffness of the resin (3) is less than 2,300 kg/cm$^2$, rebound performance is deteriorated. On the other hand, when the stiffness of the resin (3) exceeds 5000 kg/cm$^2$, spin performance is deteriorated, which results in deterioration of shot feel and controllability at the time of approach.

Examples of the resin (3) include Hi-milan 1605 (Na), Hi-milan 1555 (Na), Hi-milan 1707 (Na), Hi-milan AM7318 (Na) and Hi-milan MK7320 (K) (trade name), which are commercially available from Mitsui Du Pont Polychemical Co.; Surlyn 8920 (Na), Surlyn 8940 (Na), Surlyn AD8512 (Na), Surlyn 7930 (Li) and Surlyn 7940 (Li) (trade name), which are commercially available from Du Pont U.S.A. Co.; Iotek 8000 (Na) (trade name) which is commercially available from Exxon Chemical Co.; etc. Na, K and Li, which are described in parentheses after the trade name of the above ionomer resin indicate their neutralizing metal ion species.

In the present invention, it is necessary that the base resin of the cover is composed of a mixture of the resin (1), resin (2) and resin (3) as the main component and the cover composition containing them has a stiffness of 1,000 to 2,000 kg/cm$^2$. This reason is as follows. That is, when the stiffness of the cover composition is less than 1000 kg/cm$^2$, the cover is too soft, which results in deterioration of rebound performance. On the other hand, when the stiffness of the cover composition exceeds 2000 kg/cm$^2$, it is impossible to obtain a suitable back spin amount and, therefore, controllability and shot feel are inferior. The mixture of the resin (1), resin (2) and resin (3) occupies a main part of the above cover composition. In most cases, a small amount of a pigment (e.g. titanium dioxide, etc.) is merely added and, therefore, the stiffness of the cover composition is substantially the same as that of the mixture of the resin (1), resin (2) and resin (3).

Considering the cover composition, which contains the mixture of the resin (1), resin (2) and resin (3) as the main component of the base resin, in view of the hardness, it is preferred that the resin (1) has a Shore D hardness of 45 to 59, the resin (2) has a Shore D hardness of 61 to 70, the resin (3) has a Shore D hardness of 61 to 70, and the cover has a Shore D hardness of 50 to 60.

That is, when the Shore D hardness of the resin (1) is less than 45, the cover is too soft and rebound performance is inferior. On the other hand, when the Shore D hardness of the resin (1) exceeds 59, the cover is too hard and controllability at the time of approach is inferior, which results in deterioration of spin performance at the time of short iron. When the Shore D hardness of the resin (2) is less than 61, rebound performance is inferior. On the other hand, when the Shore D hardness of the resin (2) exceeds 70, controllability at the time of short iron or approach is inferior, which results in deterioration of spin performance at the time of short iron. In addition, when the Shore D hardness of the resin (3) is less than 61, rebound performance is inferior. On the other hand, when the Shore D hardness of the resin (3) exceeds 70, spin performance at the time of short iron is inferior. When the Shore D hardness of the cover is less than 50, rebound performance is inferior. On the other hand, when the Shore D hardness of the cover exceeds 60, controllability at the time of approach is inferior, which results in deterioration of spin performance at the time of short iron.

In the present invention, it is possible to obtain desired characteristics by mixing the above resin (1), resin (2) and resin (3). They are normally mixed with heating at 150 to 260° C. for 0.5 to 15 minutes, using internal mixers such as kneading type twin-screw extruder, Banbury, kneader, etc.

If necessary, various additives such as pigments, dispersants, antioxidants, UV absorbers, photostabilizers, etc. can be formulated in the cover composition used for forming a cover in the present invention, in addition to the mixture of the above resin (1), resin (2) and resin (3). Other resin can also be added unless characteristics of the mixture of the resin (1), resin (2) and resin (3) are not deteriorated. When the other resin is added to form a base resin of the cover as described above, the proportion of the mixture of the resin (1), resin (2) and resin (3) is preferably not less than 70% by weight, particularly not less than 80% by weight. In the present invention, "the mixture of the resin (1), resin (2) and resin (3) is used as the main component of the base resin of the cover" means a case that the base resin of the cover is composed of the mixture of the resin (1), resin (2) and resin (3) alone and a case that the other resin is added to the above mixture to form the base resin of the cover. In the present invention, the resin (1), resin (2) and resin (3) may be previously mixed, followed by mixing with the other resin. In addition, the mixture may be mixed with the other additives when the cover composition is prepared.

Further, a golf ball can be obtained by covering the cover on a core. As the core, any of a core for solid golf ball (solid core) and a core for thread wound golf ball (thread wound core) can be used.

The solid core may be not only core of a two-piece golf ball, but also core of multi-layer golf ball of two or more layers. For example, the core for a two-piece golf ball is obtained by subjecting a rubber composition to a press vulcanization to compress with heating (e.g. at a temperature of 140 to 170° C. for 10 to 40 minutes) into a spherical vulcanized article can be used, said rubber composition being prepared by formulating 10 to 60 parts by weight of at least one vulcanizing agent (crosslinking agent) of α, β-ethylenically unsaturated carboxylic acids (e.g. acrylic acid, methacrylic acid, etc.) or metal salts thereof and functional monomers (e.g. trimethylolpropane trimethacrylate, etc.), 10 to 30 parts by weight of a filler (e.g. zinc oxide, barium sulfate, etc.), 0.5 to 5 parts by weight of a peroxide (e.g. dicumyl peroxide, etc.) and 0.1 to 1 parts by weight of an antioxidant, based on 100 parts by weight of polybutadiene.

The thread wound core is composed of a center and a thread rubber wound on the center. As the center, any of a liquid center and a rubber center can be used. The rubber center my be obtained by vulcanizing the same rubber composition as that of the solid core.

The thread rubber may be those which have hitherto been used. For example, it can be obtained by vulcanizing a rubber composition which comprises a natural rubber or a combination of a natural rubber and synthetic polyisoprene, antioxidant, a vulcanizing accelerator and sulfur are formulated in. The core is not limited to a solid core and a thread wound core.

A method of covering the cover on the core is not specifically limited, but may be a normal method. For example, it includes a method comprising molding a cover composition prepared by formulating a suitable amount of a requisite additive in the above mixture of the resin (1), resin (2) and resin (3) into a semi-spherical half-shell in advance, covering a core with two half-shells and then subjecting to a pressure molding at 130 to 170° C. for 1 to 15 minutes, or a method comprising injection molding the cover composition directly on the core to cover the core. The thickness of the cover is normally about 1 to 4 mm. In case of cover molding, dimples are generally formed on the surface of the ball. Further, if necessary, a paint or marking may be provided after cover molding.

The structure of the golf ball of the present invention will be explained with reference to the accompanying drawing. FIG. 1 is a schematic cross section illustrating one embodiment of the golf ball of the present invention. The golf ball shown in FIG. 1 is a two-piece solid golf ball comprising a core 1 of a vulcanized molded rubber product and a cover 2 covering the core. The core 1 is referred to as a solid core but is not specifically limited, for example, a vulcanized molded rubber product of a rubber composition comprising polybutadiene as a main material as described above. The cover 2 covering the core is a cover composition, which contains the above mixture of the resin (1), resin (2) and resin (3). In addition, 2a is a dimple provided on the cover 2. In the golf ball shown in FIG. 1, the core 1 is composed of a vulcanized molded rubber product of a single-layer rubber, but it may also be a two-layer solid core obtained by further forming an outer core of a vulcanized molded product of a rubber composition comprising polybutadiene as a main material around an inner core of a vulcanized molded product of a rubber composition comprising polybutadiene as a main material, or a thread wound core comprising a center and a thread rubber wound thereon.

A suitable number and embodiment of dimples 2a are optionally provided on the cover 2 of the golf ball so that desired characteristics may be obtained. In addition, painting or marking is optionally provided on the surface of the golf ball.

As described above, the present invention provides a golf ball having excellent shot feel, controllability at the time of approach and excellent soft shot feel, wherein spin is easily put on at the time of iron shot.

EXAMPLES

The following Examples and Comparative Examples further illustrate the present invention in detail but are not to be construed to limit the scope thereof.

Examples 1 to 5 and Comparative Examples 1 to 4

Golf balls of Examples 1 to 5 and Comparative Examples 1 to 4 were produced through the following processes (a) to (b).

(a) Production of Core

A rubber composition prepared by formulating 30 parts by weight of zinc acrylate, 20 parts by weight of zinc oxide, 1.5 parts by weight of dicumyl peroxide and 0.5 parts by weight of an antioxidant [Yoshinox 425 (trade name), manufactured by Yoshitomi Seiyaku Co., Ltd.] in 100 parts by weight of polybutadiene [BR-01 (trade name), manufactured by Japan Synthetic Rubber Co., Ltd.] was heating at 140° C. for 30 minutes, followed by heating at 170° C. for 10 minutes to obtain a vulcanized solid core. The average diameter of the resulting core was 38.9 mm. In addition, the hardness measured at any position of the resulting core using a JIS-C type hardness tester was within a range of 78±3.

(b) Production of Cover Composition

The formulation components shown in Tables 1 to 2 were mixed using a kneading type twin-screw extruder to obtain a pelletized cover composition. Further, the cover compositions to be used for the golf balls of Examples 1 to 5, stiffness and Shore D hardness are shown in Table 1. The cover composition to be used for the golf balls of Comparative Examples 1 to 4, stiffness and Shore D hardness are shown in Table 2. In addition, the amount of each component described in the tables is represented by parts by weight. In the tables, the resin (1), resin (2) and resin (3) are represented by trade names, and the details will be explained at the back of Table 2 in order.

The extrusion conditions are as follows: a screw diameter: 45 mm; a screw revolution per minute: 200 rpm; a screw L/D: 35. The formulation components were heated at 220 to 260° C. at the die position of the extruder. The measuring methods of the stiffness and Shore D hardness are as follows.

Stiffness

It is measured according to ASTM D-747 after a sheet having a thickness of about 2 mm obtained by heat-press molding is preserved at 23° C. for two weeks.

Shore D Hardness

It is measured according to ASTM D-2240 after a sheet having a thickness of about 2 mm obtained by heat-press molding is preserved at 23° C. for two weeks.

Among the cover compositions to be used for the golf balls of Comparative Examples 1 to 4, typical one will be explained. The cover composition of Comparative Example 1 is a cover composition wherein only a high-rigid ionomer resin is used as the base resin, and the cover composition of Comparative Example 1 corresponds to a conventional standard composition for ionomer cover. The golf ball of Comparative Example 1 using this cover composition is a golf ball for a criterion of comparison.

(c) Production of Golf Ball

The cover composition of the above item (b) was injection-molded directly on the solid core of the above item (a) to cover the solid core. Then, the resulting golf ball was covered with a paint to obtain a coated golf ball having an outer diameter of 42.7 mm and a ball weight of 45.3 g.

The ball compression (PGA), rebound coefficient, durability, spin amount at the time of iron shot, run (rolling) due to sand wedge, shot feel and controllability at the time of approach of the golf ball thus obtained were examined.

The ball compression (PGA), rebound coefficient, durability, spin amount at the time of iron shot, run (rolling) due to sand wedge, shot feel and controllability at the time of approach of the golf balls of Examples 1 to 5 are shown in Table 3, and those of the golf balls of Comparative Examples 1 to 4 are shown in Table 4. Further, the measurement or evaluation method of the above ball rebound coefficient, durability, spin amount at the time of iron shot, run (rolling) due to sand wedge, shot feel and controllability at the time of approach is as follows.

Rebound Coefficient

It is determined from a ball velocity after hitting a cylindrical article (198.4 g) against the golf ball at a speed of 45 m/second.

Durability

A No. 1 wood club is fit on a swing robot manufactured by True Temper Co., and then a golf ball is hit with the club and the number of times until breakage is arisen is measured. The resulting value is indicated as a durability index in case of the number of Comparative Example 1 as a criterion for comparison being 100.

Spin Amount

No. 5 and No. 9 iron clubs are fit on a swing robot manufactured by True Temper Co., and then a golf ball is hit with each club at a head speed of 38 m/second and 34 m/second, respectively, and the spin amount is determined by taking a photograph of the hit golf ball.

Run Due to Sand Wedge

Run of a golf ball on the green is measured after hitting the golf ball from the position which is 60 yards apart from the green end.

Shot Feel At The Time of Approach

It is evaluated with 10 top professional golfers according to a practical hitting test using a pitching wedge. The evaluation criteria are as follows. The results shown in the Tables below are based on the fact that not less than 8 out of 10 professional golfers evaluated with the same criterion about each test item.

Evaluation Criteria

○: Soft and Excellent

Δ: Slightly hard x: Hard and inferior

Controllability At The Time of Approach

It is evaluated with 10 top professional golfers by practically hitting a golf ball with a pitching wedge toward the green. The evaluation criteria are as follows. The results shown in the Tables below are based on the fact that not less than 8 out of 10 professional golfers evaluated with the same criterion about each test item.

Evaluation Criteria

○: It feels that a golf ball is placed on the club face and spin is easily put on the golf ball and, therefore, the golf ball stops satisfactorily on the green and is superior in controllability.

x: It feels that a golf ball is not placed on the club face but it slides thereon and spin is not easily put on the golf ball and, therefore, the golf ball does not stops easily on the green and is inferior in controllability.

TABLE 1

| | Comparative Example No. | | | | |
|---|---|---|---|---|---|
| | 1 | 2 | 3 | 4 | 5 |
| Resin (1): | | | | | |
| Hi-milan 1855 ※1 | 75 | 85 | 70 | 40 | 85 |
| Resin (2): | | | | | |
| Hi-milan 1706 ※2 | 20 | 10 | 15 | 0 | 5 |
| Hi-milan 1557 ※3 | 0 | 0 | 0 | 45 | 0 |
| Resin (3): | | | | | |
| Hi-milan 1555 ※4 | 5 | 5 | 0 | 15 | 0 |
| Hi-milan 1605 ※5 | 0 | 0 | 15 | 0 | |
| Surlyn 7940 ※6 | 0 | 0 | 0 | 0 | 10 |
| Titanium dioxide | 2 | 2 | 2 | 2 | 2 |
| Stiffness (kg/cm$^2$) | 1500 | 1200 | 1700 | 1900 | 1400 |
| Shore D hardness | 58 | 57 | 59 | 60 | 57 |

TABLE 2

| | Comparative Example No. | | | |
|---|---|---|---|---|
| | 1 | 2 | 3 | 4 |
| Resin (1): | | | | |
| Hi-milan 1855 ※1 | 0 | 60 | 40 | 25 |
| Resin (2): | | | | |
| Hi-milan 1706 ※2 | 50 | 0 | 50 | 0 |
| Hi-milan 1557 ※3 | 0 | 20 | 0 | 60 |
| Resin (3): | | | | |
| Hi-milan 1555 ※4 | 0 | 0 | 0 | 15 |
| Hi-milan 1605 ※5 | 50 | 20 | 10 | 0 |
| Titanium dioxide | 2 | 2 | 2 | 2 |
| Stiffness (kg/cm$^2$) | 3200 | 1800 | 2400 | 2100 |
| Shore D hardness | 68 | 61 | 62 | 61 |

※1: Hi-milan 1855 (trade name), ionomer resin obtained by neutralizing a terpolymer of ethylene, methacrylic acid and acrylate with zinc ion, manufactured by Mitsui Du Pont Polychemical Co., Ltd., stiffness: 900 kg/cm$^2$, Shore D hardness: 55

※2: Hi-milan 1706 (trade name), ionomer resin obtained by neutralizing a copolymer of ethylene and methacrylic acid with zinc ion, manufactured by Mitsui Du Pont Polychemical Co., Ltd., stiffness: 3400 kg/cm$^2$, Shore D hardness: 61

※3: Hi-milan 1557 (trade name), ionomer resin obtained by neutralizing a copolymer of ethylene and methacrylic acid with zinc ion, manufactured by Mitsui Du Pont Polychemical Co., Ltd., stiffness: 2600 kg/cm$^2$, Shore D hardness: 57

※4: Hi-milan 1555 (trade name), ionomer resin obtained by neutralizing a copolymer of ethylene and methacrylic acid with a sodium ion, manufactured by Mitsui Du Pont Polychemical Co., Ltd., stiffness: 2600 kg/cm$^2$, Shore D hardness: 57

※5: Hi-milan 1605 (trade name), ionomer resin obtained by neutralizing a copolymer of ethylene and methacrylic acid with a sodium ion, manufactured by Mitsui Du Pont Polychemical Co., Ltd., stiffness: 3800 kg/cm$^2$, Shore D hardness: 62

※6: Surlyn 7940 (trade name), ionomer resin obtained by neutralizing a copolymer of ethylene and methacrylic acid with a lithium ion, manufactured by Du Pont U.S.A. Co, stiffness: 4200 kg/cm$^2$, Shore D hardness: 63

TABLE 3

| | Example No. | | | | |
|---|---|---|---|---|---|
| | 1 | 2 | 3 | 4 | 5 |
| Ball compression (PGA) | 85 | 84 | 86 | 87 | 85 |
| Rebound coefficient | 0.763 | 0.760 | 0.765 | 0.767 | 0.764 |
| Durability (index) | 200 | 210 | 190 | 180 | 200 |
| Spin amount (rpm) due to No. 5 iron club | 5000 | 5100 | 4900 | 4800 | 5000 |
| Spin amount (rpm) due to No. 9 iron club | 7800 | 8000 | 7700 | 7600 | 8000 |
| Run (cm) due to sand wedge | 65 | 40 | 65 | 80 | 45 |
| Shot feel at the time of approach | ◯ | ◯ | ◯ | ◯ | |
| Controllability at the time of approach | ◯ | ◯ | ◯ | ◯ | |

TABLE 4

| | Comparative Example No. | | | |
|---|---|---|---|---|
| | 1 | 2 | 3 | 4 |
| Ball compression (PGA) | 102 | 88 | 84 | 92 |
| Rebound coefficient | 0.782 | 0.765 | 0.771 | 0.769 |
| Durability (index) | 100 | 190 | 150 | 160 |
| Spin amount (rpm) due to No. 5 iron club | 3700 | 4900 | 4300 | 4600 |
| Spin amount (rpm) due to No. 9 iron club | 6200 | 7600 | 7100 | 7400 |
| Run (cm) due to sand wedge | 270 | 135 | 185 | 170 |
| Shot feel at the time of approach | X | X | X | X |
| Controllability at the time of approach | X | X | X | X |

As is apparent from a comparison between ball characteristics of the golf balls of Examples 1 to 5 shown in Table 3 and those of the golf balls of Comparative Examples 1 to 4 shown in Table 4, the golf balls of Examples 1 to 5 of the present invention showed excellent controllability at the time of approach and excellent soft shot feel, and spin was easily put at the time of iron shot.

To the contrary, the golf ball of Comparative Example 1 showed inferior controllability at the time of approach and hard and inferior fit feeling, and spin is not easily put on at the time of iron shot because only a high-rigid ionomer resin is used as the base resin of the cover.

In addition, the golf ball of Comparative Example 2 showed large run due to sand wedge because it contains 20% by weight of the resin (3) which is an ionomer resin neutralized with a sodium ion as the base resin of the cover, and was inferior in controllability at the time of approach and shot feel.

The golf ball of Comparative Example 3 is hard because the stiffness of the cover composition is high. Therefore, spin is not easily put on at the time of iron shot and run due to sand wedge became large. In addition, controllability at the time of approach was inferior and shot feel was also inferior. In addition, regarding the golf ball of Comparative Example 4, the stiffness of the cover is high and the hardness of the golf ball is high because the amount of the resin (1) having low stiffness is small such as 25% by weight and the amount of the resin (2) having high stiffness is large such as 60% by weight. Therefore, controllability at the time of approach was inferior and shot feel was also inferior.

What is claimed is:

1. A golf ball having a core and a cover for covering the core, wherein a base resin of said cover comprises a mixture of the following resin (1), resin (2) and resin (3) as a main component, the total amount of the resin (1) and resin (2) being 85 to 98% by weight of the mixture; the amount of the resin (3) being 2 to 15% by weight of the mixture; the amount of the resin (1) being 35 to 96.5% by weight and the amount of the resin (2) being 3.5 to 65% by weight of the total of resin (1) and resin (2); and a stiffness of the cover composition being 1,000 to 2,000 kg/cm$^2$, wherein resins (1), (2) and (3) are as follows:

resin (1): an ionomer resin having a stiffness of 700 to 1,200 kg/cm$^2$, which is obtained by neutralizing a terpolymer of ethylene, methacrylic acid and acrylate with zinc ion;

resin (2): an ionomer resin having a stiffness of 2,500 to 5,000 kg/cm$^2$, which is obtained by neutralizing a copolymer of ethylene and methacrylic or acrylic acid with zinc ion; and resin (3): an ionomer resin having a stiffness of 2,300 to 5,000 kg/cm$^2$, which is obtained by neutralizing a copolymer of ethylene and methacrylic or acrylic acid with an alkali metal ion.

2. The golf ball according to claim 1, wherein the resin (1) has a Shore D hardness of 45 to 59, the resin (2) has a Shore D hardness of 61 to 70, the resin (3) has a Shore D hardness of 61 to 70, and the cover has a Shore D hardness of 50 to 60.

3. The golf ball according to claim 1, wherein the three resins (1), (2), and (3) constitute not less than 80% by weight of the cover composition.

4. The golf ball according to claim 1, wherein the cover composition consists essentially of a mixture of the resins (1), (2), and (3).

5. The golf ball according to claim 1, wherein the golf ball has a two piece structure.

* * * * *